(12) United States Patent
Lubomirsky

(10) Patent No.: US 6,788,040 B2
(45) Date of Patent: Sep. 7, 2004

(54) POWER HOLDUP CIRCUIT WITH INCREASED POWER FACTOR

(75) Inventor: Vadim Lubomirsky, Rochester, NY (US)

(73) Assignee: ENI Technology, Inc., Rochester, NY (US)

( * ) Notice: Subject to any disclaimer, the term of this patent is extended or adjusted under 35 U.S.C. 154(b) by 0 days.

(21) Appl. No.: 10/255,425

(22) Filed: Sep. 26, 2002

(65) Prior Publication Data

US 2004/0061484 A1 Apr. 1, 2004

(51) Int. Cl.$^7$ .................................................. G05F 5/00
(52) U.S. Cl. ....................................................... 323/303
(58) Field of Search ................................ 323/223, 226, 323/229, 231, 233, 268, 271, 273, 274, 299, 303

(56) References Cited

U.S. PATENT DOCUMENTS 4,811,190 A * 3/1989 Keir et al. ..................... 363/60
5,828,207 A * 10/1998 Saadeh ......................... 323/281
6,504,497 B2 * 1/2003 Jang et al. .................... 341/125

* cited by examiner

Primary Examiner—Matthew V. Nguyen
(74) Attorney, Agent, or Firm—Harness, Dickey & Pierce P.L.C.

(57) ABSTRACT

A power holdup circuit having high power factor during line voltage dropouts is provided in a less complex design. No external monitoring and control is required. A monitoring component of the holdup circuit monitors input voltage to maintain the high power factor. Power from a holdup power source is provided during a line voltage dropout. The circuit is configured to switch to holdup power when a predetermined threshold voltage difference between the power supply and a holdup capacitor is exceeded. The threshold voltage is based upon a voltage rating of a zener diode plus a turn-on voltage of a transistor, which is the switching component of the holdup circuit. The holdup capacitor is precharged to a predetermined level through the diode of the transistor. A power factor of not less than about 0.9 is thereby maintained during line voltage dropouts.

31 Claims, 2 Drawing Sheets

POWER HOLDUP CIRCUIT WITH INCREASED POWER FACTOR

FIELD OF THE INVENTION

The present invention relates generally to systems for controlling line voltage, and more particularly to a circuit for maintaining power factor during line voltage dropouts in, for example, power conversion equipment.

BACKGROUND OF THE INVENTION

Power factor relates generally to the efficiency of a system in using power and is preferably maintained at a high level (i.e., 0.9 or higher) to minimize loses. In particular, power factor defines the relationship between the actual/active or real power being used by the system (i.e., measured in kilo-Watts (KW)) and the total power supplied and available to the system. Further, total power is defined by apparent power (i.e., measured in volt-amps (VA)), which includes a non-working component (i.e., reactive power (kVAR)). Thus, it is desirable to reduce, as much as possible, the reactive power component. Reactive power is generally not useful power, and typically provides for sustaining the electromagnetic field in systems.

Specifically, power factor is a value between 0 and 1, and represents the amount of power actually being used (i.e., real power divided by apparent power) by a device or system. A high power factor indicates that a system is using power efficiently, while a low power factor indicates that a system in using power less efficiently. Thus, when the power factor is 1, real power and apparent power are equal, with the system using power at 100% efficiency. However, when the current from a power source includes harmonics, or when it is not in phase with the voltage (e.g., reactive device), the power factor of the system is reduced (i.e., less than 1), thus indicating a less efficient system.

For example, reactive power may be caused by a phase shift between AC current and voltage in inductors and capacitors within a system. With respect to inductors causing phase shift, current is said to lag behind voltage, and in capacitors causing phase shift, current is said to lead voltage. Typically, when inductive loads cause lagging in a system, appropriate capacitors are used to correct and offset the lagging effect (i.e., increase power factor).

Depending upon the power supplier, the cost of receiving power may increase if power factor is not sustained at a specific minimum level (i.e., 0.9). Further, because power factor represents power that could be used, but is not, increasing the use of the available power will reduce overall cost. Additionally, larger wiring and transformers may be needed when power factor is low. Thus, a low power factor may have numerous negative effects on different aspects of a system.

Further, government regulations for certain power conversion equipment require high power factors (i.e., above 0.9). Additionally, regulations for semiconductor processing equipment also require sustaining power sources through line voltage dropouts, which further require energy storage elements at the power supply input that may need power correction.

Power factor correction (PFC) devices are known that provide for maintaining power factor at higher levels, typically above 0.85, and particularly during line voltage dropouts. Both passive and active devices have been developed in an attempt to increase and maintain the power factor of a system at a high level. In a passive approach, an inductor is provided at the input of the circuit or system, usually ahead of an electrolytic capacitor bank. This helps to reduce harmonic distortion within the system and allows equipment to obtain a power factor of between about 0.8 and 0.9. However, the inductance value required increases exponentially with the power factor improvement desired. When a power factor above 0.9 is desired or required, the size and weight of the inductor becomes prohibitive.

Active approaches include boost, buck or flyback converters in connection with monitoring devices that monitor various variables within the system. In particular, the input voltage, the output voltage and current at the input of the system are monitored to maintain the power factor. However, although these PFC devices sustain power through a line voltage dropout and provide higher power factors (i.e., about 0.9), these devices are complex, resulting in their size and cost increasing significantly. Reliability of the system also may be reduced with the addition of these complex control components.

Thus, there exists a need for a system for maintaining power during a line voltage dropout that is less complex in design, lower in cost and that provides a higher power factor.

SUMMARY OF THE INVENTION

The present invention generally includes a circuit and method of providing the same that has holdup capability with a high power factor during line voltage dropout. The circuit is less complex in design and requires no external monitoring and control for providing the holdup capability. The present invention monitors the input voltage to a system and switches to a holdup power source when needed (e.g., during a single cycle line voltage dropout). Power from the primary source (i.e., line voltage) is restored after the dropout condition ends. The holdup power source is appropriately charged based upon the input power source to the system and the requirements of the system.

Specifically, in one embodiment of the present invention, a power holdup circuit of the present invention having a high power factor (e.g., about 0.9 or higher) generally includes monitoring means for monitoring input voltage and specifically, the difference between a power supply voltage and a holdup capacitor voltage, and switching means for turning on the holdup power source when the difference between the power supply voltage and holdup capacitor voltage exceeds a predetermined threshold voltage. The switching means may include a diode and a transistor, with the predetermined threshold voltage defined by the voltage rating of the diode plus the turn-on voltage of the transistor. The power holdup circuit may be turned on (i.e., switched on) when the difference between the power supply voltage and the holdup capacitor voltage exceeds the predetermined threshold voltage.

The diode may be a zener diode and the transistor may be a metal-oxide-silicon field-effect transistor. Further, the holdup capacitor may be precharged to a predetermined level and charges through a diode of the transistor. A precharge resistor also may be provided to limit the peak current for charging the holdup capacitor. The power holdup circuit may be configured such that the monitoring and switching means provide a power factor of not less than about 0.9.

In another embodiment of the present invention, an input circuit adapted for maintaining power factor during line voltage dropout of a rectified alternating current source includes holdup means having stored power for use during voltage dropout, and control means for monitoring the difference between the voltage of the rectified alternating current source and the voltage of the holdup means. The control means is adapted to switch power from the rectified alternating current source to the holdup means when the difference exceeds a predetermined value.

The holdup means may include a capacitor adapted to be charged to the peak voltage value of the rectified alternating current source. The holdup means may further include a precharge resistor adapted for limiting the charging current to the capacitor. The control means also may include a diode and a transistor, with the predetermined value defined by the voltage rating of the diode plus the turn-on voltage of the transistor. The transistor may include a diode (e.g., body diode), which is adapted to precharge the capacitor.

The control means may be adapted to switch on backup power storage when the voltage of the holdup means reaches a predetermined minimum value defined by the turn-on voltage of the transistor. The holdup means and control means also may be adapted for operation with both a single-phase and a three-phase rectified alternating current source.

A method of the present invention for maintaining power factor when voltage temporarily decreases in a system includes monitoring the input voltage, and in particular, the difference between an input source and a holdup capacitor, and switching power from the input source to the holdup capacitor when the difference exceeds a predetermined amount defined by the voltage rating of a diode plus the turn-on voltage of a transistor. The method further may include charging the holdup capacitor to the maximum (i.e., peak) voltage of the input source and limiting the current when performing the step of charging. A diode within the transistor may be used to recharge the capacitor, or a separate diode may be used.

Thus, the present invention provides a circuit and method for maintaining high power factor without the need for complex monitoring and control. The circuit monitors the input voltage and switches to a holdup power source to provide power upon detecting a threshold change in input voltage.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to a circuit having specific component parts for implementing a circuit to maintain high power factor that is sustained during a line voltage dropout, it is not so limited, and variations and modifications in design and construction are contemplated.

Figure 1:
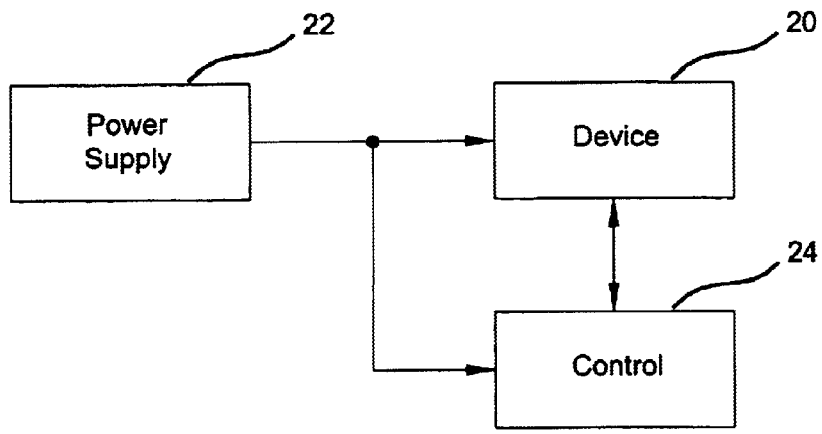
FIG. 1 is a simplified block diagram of a known system for providing power factor correction.

With respect to controlling an electrical power source to provide high power factor in a system, this may be further understood with reference to FIG. 1. Thus, before further describing the invention, it is useful to understand the control needed to maintain the power factor of a system during line voltage dropouts (i.e., power factor correction).

Generally, power factor correction for maintaining high power factor during line voltage dropouts has been provided using an external control. In particular, and as shown in FIG. 1, a device 20 (e.g., power conversion device) powered by a power supply 22 (e.g., rectified AC source) may experience phase shifts and harmonics in the electrical power. In order to offset these conditions, an external power factor correction control 24, which may be passive or active, is provided to monitor the power supply 22 and to maintain higher power factor. Specifically, the external power factor correction control 24 typically includes complex circuits for monitoring and controlling electrical power from the power supply 22. In particular, the external power factor correction control 24 generally monitors the input voltage, the output voltage and the input current in order to determine whether voltage adjustments are necessary to maintain a high power factor.

Figure 2:
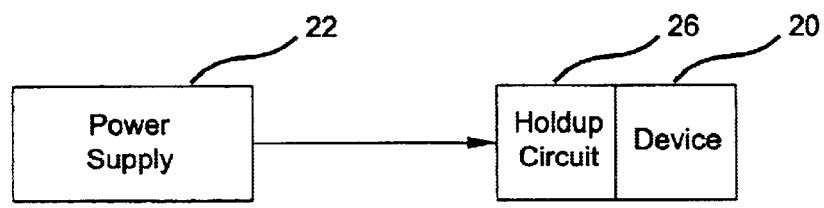
FIG. 2 is a simplified block diagram of a system having a holdup circuit constructed according to the principles of the present invention therein.

Having described an external power factor correction control 24 for monitoring electrical power from a power supply 22 to maintain high power factor, the present invention provides a holdup circuit with high power factor during line voltage dropouts that may be simply provided as part of a device 20. In general, and as shown in FIG. 2, the holdup circuit 26 is provided as part of the device 20 (i.e., no external control required) to monitor and control electrical power from the power supply 22. The holdup circuit 26 provides for switching to a holdup power source 32 to sustain a high power factor during a line voltage dropout. For example, semiconductor processing equipment must withstand a voltage drop of fifty percent on one phase of a three phase input line.

Figure 3:
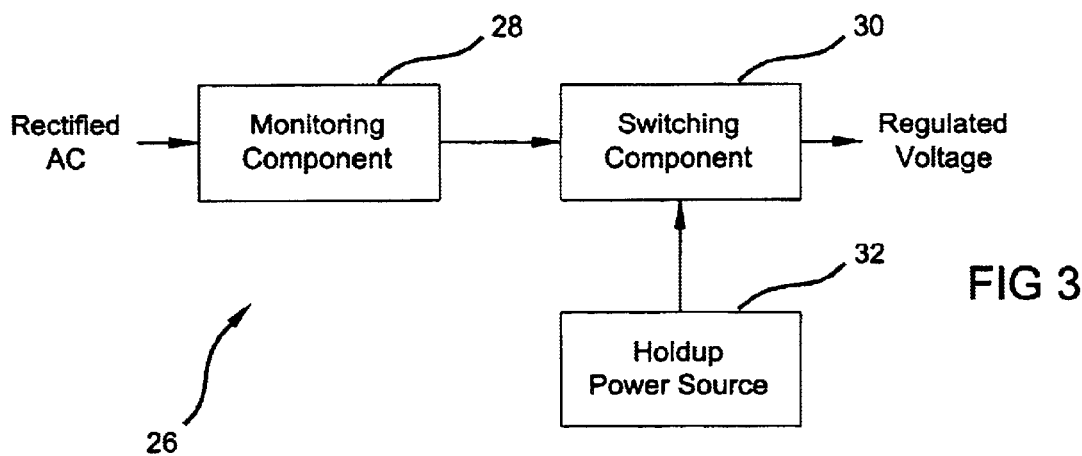
FIG. 3 is a simplified block diagram of a holdup circuit of the present invention.

More specifically, and as shown in FIG. 3, the holdup circuit 26 includes a monitoring component 28 for monitoring an input electrical power supply 22 (e.g., rectified AC power source) and a switching component 30 for switching to a holdup power source 32 during a line voltage dropout to provide a regulated voltage with a high power factor. The monitoring component 28 monitors incoming voltage to determine when electrical power from the holdup power source 32 is needed.

Figure 4:
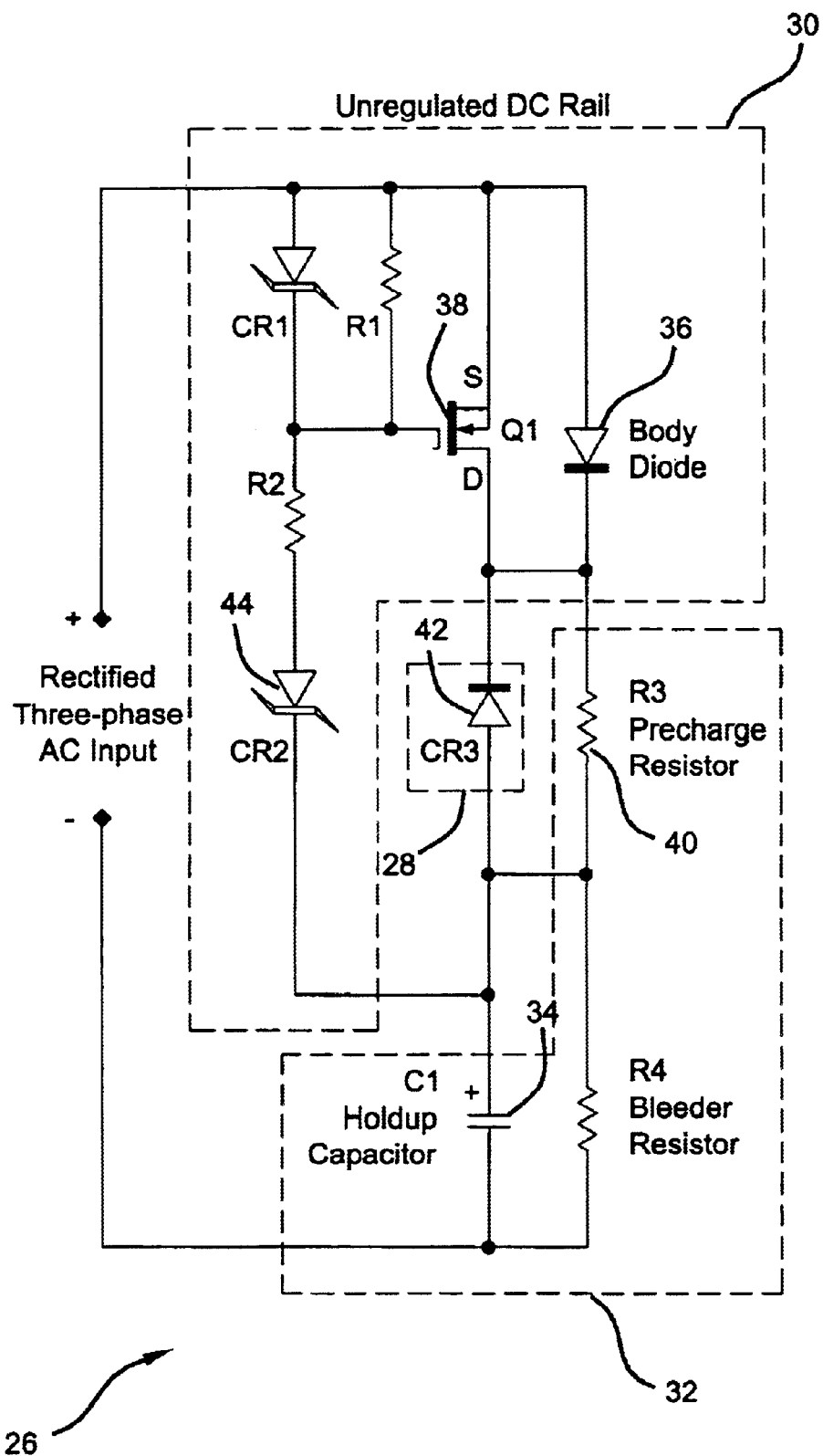
FIG. 4 is a schematic diagram of a holdup circuit of the present invention.

In a more preferred construction as shown in FIG. 4, the holdup circuit 26 may receive a rectified three-phase AC input that is maintained at a high power factor (i.e., about 0.9 or higher). It should be noted that the present invention is not limited to controlling a particular type of input, and may control, for example, a rectified single-phase AC input. As shown in FIG. 4, a hold-up capacitor 34 charges through diode 36 of transistor (Q1) 38 upon power-up of the device 20. Preferably, the capacitor is charged to the peak voltage of the rectified AC input. It should be noted that diode 36 is part of transistor 38. It should also be noted that transistor 38 is preferably a metal-oxide-silicon field-effect transistor (MOSFET) or an insulated-gate bipolar transistor (IGBT).

Resistor (R3) 40 is a precharge resistor that limits the charging current to a value that will not damage diode 36. It should further be noted that depending upon operating conditions (e.g., temperature) the rating of the capacitor 34 may be modified (e.g., higher ripple capability or higher temperature operation).

The hold-up capacitor 34 is preferably charged and remains charged to the peak value of the unregulated input DC rail (i.e., power source). In operation, and during an AC line voltage dropout, voltage at the anode of diode (CR3) 42 becomes positive with respect to the source of Q1 38. When the voltage difference between the unregulated DC rail and the voltage at the anode of CR3 42 (i.e., fully charged voltage of holdup capacitor 34) reaches the sum of the voltage rating of zener diode (CR2) 44 plus the turn-on voltage of Q1 38, Q1 38 turns on and connects the holdup capacitor 34 across the DC rail. It should be noted that Q1 38 will turn off when the holdup capacitor 34 is discharged to the point where it can no longer keep Q1 38 turned on, or when the line voltage dropout is over and the line voltage (i.e. rail voltage) is restored.

It should be noted that diode (CR1) 41 provides overvoltage protection to the gate of Q1 38. Further, resistor (R1) 43 provides that Q1 38 is completely turned off when not experiencing a line voltage dropout. Resistor (R2) 46 provides current limiting for CR1 41 and CR2 44 during line voltage dropout. Resistor (R4) 48 discharges the hold-up capacitor (C1) 34 when equipment is turned off.

It should be noted that as the loading on the power supply reaches its maximum and/or line frequency is reduced, the voltage ripple across the DC rail gets larger. Under this condition, Q1 38 will turn on every time the DC rail voltage is near its lowest point (i.e., valley) and limit the ripple magnitude. Thus, the DC rail is stiffened (i.e., less ripple) without reducing power factor. It should also be noted that the only inductance in the holdup circuit 26 is located within the input AC line filter, and only enough to ensure that conducted emissions are filtered.

Although the present invention has been described in connection with specific component parts providing high power factor, it is not so limited. For example, in constructing a holdup circuit, the various components may be modified or replaced depending upon system requirements and the characteristics of the input line voltage.

The description of the invention is merely exemplary in nature and, thus, variations that do not depart from the gist of the invention are intended to be within the scope of the invention. Such variations are not to be regarded as a departure from the spirit and scope of the invention as claimed.

What is claimed is:

1. A power holdup circuit having high power factor, the power holdup circuit comprising:
    monitoring means for monitoring a difference between a power supply voltage and a holdup capacitor voltage; and
    switching means for turning on the holdup capacitor when the difference between the power supply voltage and holdup capacitor voltage exceeds a predetermined threshold level.

2. The power holdup circuit according to claim 1 wherein the switching means comprises a diode and a transistor configured wherein the predetermined threshold level is defined by a voltage rating of the diode plus a turn-on voltage of the transistor, and the holdup circuit is turned on when the difference between the power supply voltage and the holdup capacitor voltage exceeds the predetermined threshold voltage.

3. The power holdup circuit according to claim 2 wherein the diode comprises a zener diode and the transistor comprises a metal-oxide-silicon field-effect transistor.

4. The power holdup circuit according to claim 2 wherein the predetermined threshold voltage is below the voltage of the holdup capacitor when charged.

5. The power holdup circuit according to claim 2 wherein the holdup capacitor is charged to a predetermined level.

6. The power holdup circuit according to claim 5 wherein the predetermined level is the peak voltage of the power supply.

7. The power holdup circuit according to claim 2 wherein the holdup capacitor charges through a diode of the transistor.

8. The power holdup circuit according to claim 7 further comprising a precharge resistor to limit the peak current for charging the holdup capacitor.

9. The power holdup circuit according to claim 2 wherein the power supply comprises an alternating current.

10. The power holdup circuit according to claim 2 wherein the monitoring and switching means are configured to provide a power factor of not less than about 0.9.

11. An input circuit adapted for maintaining power factor during voltage dropout of an input power source, the input circuit comprising:
    holdup means having stored power for use during voltage dropout; and
    control means for monitoring a difference between the voltage of the input power source and the voltage of the holdup means, and adapted for switching power from the input power source to the holdup means when the difference exceeds a predetermined value.

12. The input circuit according to claim 11 wherein the input power source comprises a rectified alternating current source and the holdup means comprises a capacitor adapted to be charged to the peak voltage value of the rectified alternating current source.

13. The input circuit according to claim 12 wherein the holdup means further comprises a precharge resistor adapted for limiting the charging current to the capacitor.

14. The input circuit according to claim 11 wherein the control means comprises a diode and a transistor and the predetermined value is defined by the voltage rating of the diode plus the turn-on voltage of the transistor.

15. The input circuit according to claim 14 wherein the transistor comprises a body diode adapted to precharge the capacitor.

16. The input circuit according to claim 14 wherein the control means is adapted to switch on a backup power storage when the voltage of the holdup means reaches a predetermined minimum value defined by the turn-on voltage of the transistor.

17. The input circuit according to claim 11 wherein the holdup means and control means are adapted for operation with both a single phase and a three phase rectified alternating current source.

18. A method of maintaining power factor when voltage temporarily decreases from a power source, the method comprising the steps of:
    monitoring the voltage difference between an input source and a holdup capacitor;
    switching power from the input source to the holdup capacitor when the difference exceeds a predetermined amount defined by the voltage rating of a diode plus the turn-on voltage of a transistor.

19. The method according to claim 18 further comprising charging the holdup capacitor to the maximum peak voltage of the input source.

20. The method according to claim 19 further comprising limiting the current when performing the step of charging.

21. The method according to claim 18 further comprising using a diode within the transistor to control parasitic effects.

22. A power holdup circuit comprising:
- a monitoring circuit for monitoring a difference between a power supply voltage and an energy storage element; and
- a switch circuit, the switch circuit turning on to release energy from the energy storage element when the difference between the power supply voltage and an energy storage element voltage exceeds a predetermined threshold level.

23. The power holdup circuit according to claim 22 wherein the switch circuit comprises a diode and a transistor configured wherein the predetermined threshold level is defined by a voltage rating of the diode plus a turn-on voltage of the transistor, and the holdup circuit is activated when the difference between the power supply voltage and the holdup capacitor voltage exceeds the predetermined threshold voltage.

24. The power holdup circuit according to claim 23 wherein the diode comprises a zener diode and the transistor comprises a metal-oxide-silicon field-effect transistor.

25. The power holdup circuit according to claim 23 wherein the predetermined threshold voltage is below the voltage of the energy storage device when the energy storage element is fully charged.

26. The power holdup circuit according to claim 23 wherein the energy storage element is charged to a predetermined level.

27. The power holdup circuit according to claim 26 wherein the predetermined level is the peak voltage of the power supply.

28. The power holdup circuit according to claim 23 wherein the energy storage element charges through a body diode of the transistor.

29. The power holdup circuit according to claim 28 further comprising a precharge resistor to limit the peak current for charging the energy storage element.

30. The power holdup circuit according to claim 23 wherein the power supply provides an alternating current voltage.

31. The power holdup circuit according to claim 23 wherein the monitoring circuit and switch circuit provide a power factor of not less than about 0.9.

* * * * *